US009530324B2

(12) United States Patent
Stayton et al.

(10) Patent No.: US 9,530,324 B2
(45) Date of Patent: Dec. 27, 2016

(54) SYSTEMS AND METHODS FOR PROVIDING OPTIMAL TAXI CLEARANCES

(75) Inventors: Gregory T. Stayton, Peoria, AZ (US); Peter J. Bobrowitz, Cave Creek, AZ (US); Charles C. Manberg, Peoria, AZ (US); Richard D. Ridenour, II, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 0 days.

(21) Appl. No.: 12/775,289

(22) Filed: May 6, 2010

(65) Prior Publication Data

US 2011/0029225 A1 Feb. 3, 2011

Related U.S. Application Data

(60) Provisional application No. 61/176,038, filed on May 6, 2009.

(51) Int. Cl.

*G06F 19/00* (2011.01)
*G08G 5/06* (2006.01)

(52) U.S. Cl.

CPC .................................... *G08G 5/065* (2013.01)

(58) Field of Classification Search

USPC .......................................................... 701/120

See application file for complete search history.

(56) References Cited

U.S. PATENT DOCUMENTS

| | | | | |
|---|---|---|---|---|
| 7,116,266 | B1 * | 10/2006 | Vesel et al. | 342/30 |
| 7,720,630 | B1 * | 5/2010 | Miller et al. | 702/150 |
| 2003/0004633 | A1 * | 1/2003 | Russell et al. | 701/96 |
| 2003/0169301 | A1 * | 9/2003 | McCauley et al. | 345/810 |
| 2005/0165516 | A1 * | 7/2005 | Haissig et al. | 701/4 |
| 2009/0265090 | A1 * | 10/2009 | Poe et al. | 701/120 |
| 2009/0299552 | A1 * | 12/2009 | Villaume et al. | 701/3 |
| 2010/0027768 | A1 * | 2/2010 | Foskett | 379/88.14 |
| 2010/0198489 | A1 * | 8/2010 | Rozovski et al. | 701/120 |
| 2010/0324807 | A1 * | 12/2010 | Doose et al. | 701/120 |

* cited by examiner

*Primary Examiner* — Hussein A. Elchanti

(74) *Attorney, Agent, or Firm* — Allen J. Moss; Squire Patton Boggs (US) LLP

(57) ABSTRACT

A system is delineated comprising a display and a receiver coupled to the display for receiving data for presenting on the display, the data representing spoken VHF messages.

11 Claims, 1 Drawing Sheet

Optimal Taxi Clearances System

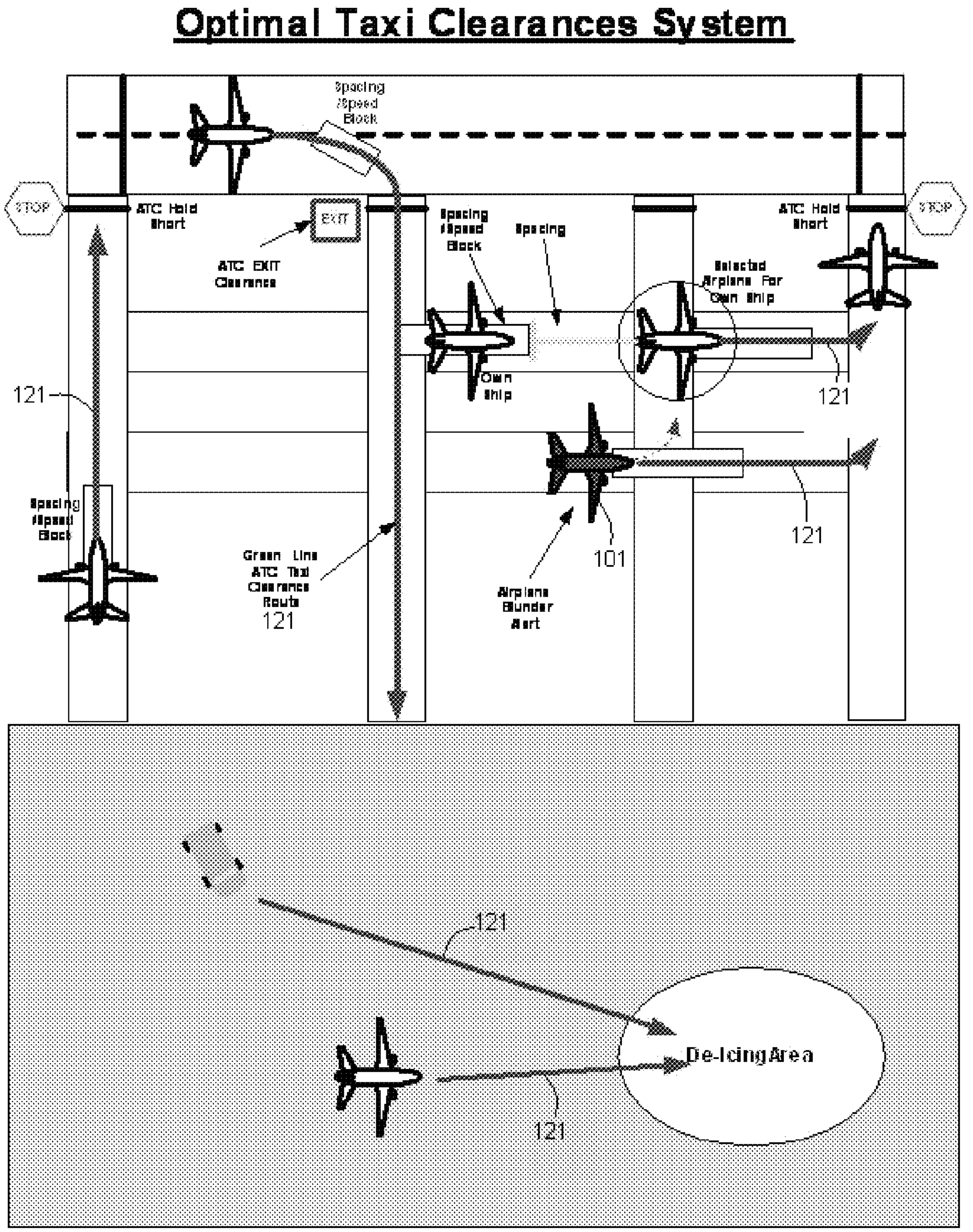
Optimal Taxi Clearances System
Spacing /Speed Block
STOP
ATC Hold Short
EXIT
ATC EXIT Clearance
Spacing /Speed Block
Spacing
ATC Hold Short
STOP
Selected Airplane For Own Ship
Own Ship
121
121
121
Spacing /Speed Block
Green Line ATC Taxi Clearance Route 121
Airplane Blunder Alert
101
121
De-Icing Area
121

SYSTEMS AND METHODS FOR PROVIDING OPTIMAL TAXI CLEARANCES

CROSS REFERENCE TO RELATED APPLICATIONS

This application is related to and claims priority from U.S. Provisional Patent Application No. 61/176,038, as filed on May 6, 2009 and entitled "SYSTEMS AND METHODS FOR PROVIDING OPTIMAL TAXI CLEARANCES," which is hereby incorporated by reference.

BACKGROUND OF THE INVENTION

Field of the Invention

The present invention relates to avionics systems, and more particularly, to systems and methods for providing optimal taxi clearances.

Description of the Related Art

FAA Ground Air Traffic Control (ATC) procedures currently use a single VHF radio channel to verbally direct traffic from the gate to the runway via taxiways located at various strategic areas around airport. Air crews also use the same VHF radio channel to confirm ground clearances given by ATC and often times "step on" or transmit at the same time as ATC or other air crew radio transmissions. This can result in the loss of communications by the intended recipient without the awareness of the transmitter or recipient knowing that a message was lost. No visual display is used of the traffic on the ground so the ATC controller must rely upon his own mental picture of the situation and also rely upon the air crews to accurately execute his instructions. When air crews become confused and follow a different airplane, take a wrong turn, or take a non-directed short cut, the controller can become confused and must then transmit multiple radio verbal questions to try to discern and redevelop a new mental picture of the situation. This can result in not only a lot of confusion, but is not at all conducive of optimal taxiing from or to the runway by the airplanes or other vehicular airport resources resulting in wasted time, fuel, increased emissions, loss of airport traffic handling capacity, and dissatisfied passengers.

Thus, a need exists for improved systems and methods, which overcome these and other problems.

SUMMARY OF THE INVENTION

In accordance with an embodiment of the present invention, a system is disclosed comprising a display and a receiver coupled to the display for receiving data for presenting on the display, the data representing spoken VHF messages.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 is a simplified representation of a display, in accordance with systems and methods consistent with the present invention.

DESCRIPTION OF THE EMBODIMENTS

Reference will now be made in detail to the present exemplary embodiments of the invention, examples of which are illustrated in the accompanying drawings.

This invention describes an Optimal Taxi Clearance system that can automate many of the controller functions and may convert most if not all of the verbal VHF radio messages into data linked messages over a new or existing data link eliminating interference and confusion. Optimal Taxi Clearance, Routing instructions, and alerting information may be provided by this invention leading to a reduction in wasted time, wasted fuel, and emissions resulting in an increase in airport traffic handling capacity, increasing airline and passenger satisfaction.

This invention also provides for a centralized management of clearances using ADS-B, ASDE-X or other tracking means that is able to meet the integrity and accuracy of vehicle state requirements for ATC Taxi clearances and alerting.

FIG. 1 below depicts some of the functions and display features with an example of the type of symbology that may be used to provide various indications to the flight crew. Shown in the FIGURE is an airplane making a turn off the runway to an FAA ATC assigned taxi exit and assigned taxi routing by use of a Spacing/Speed Block and green line indication of the assigned taxiway route. In this case the Block is used as a speed target for the exiting airplane to provide an optimal time to get to the gate destination. This airplane may enter a cruise control mode so that the speed is automatically controlled to provide the most optimal usage of the taxiway surface. Own ship is shown with a Spacing/Speed Block and a yellow line symbol to indicate the distance to maintain behind another airplane, shown as a Selected reference airplane with a circular highlighting symbol. Own ship may also use a cruise control to monitor the spacing and speed and to stop Own ship in the event that the selected reference airplane suddenly and unexpectedly stops. This feature may be able to reduce pilot work load on the ground which is a significant benefit since ground taxiing today is all manually done which causes a very intensive work load for the flight crew.

Also depicted is a Red highlighted airplane (101) which is shown accelerating into a turn down the wrong taxiway. A potential collision or traffic flow confliction is indicated by the red highlight and an aural alert is given to the flight crew. The correct path is also indicated by the green line (121) in front of the airplane. This airplane and others may or may not be equipped, but their intended route structure is uplinked to own airplane for situational awareness and alerting purposes. As shown at the bottom of the FIGURE below, airplanes and other vehicles may also be routed with similar symbology anywhere around the airport surface such as the depicted routing of an airplane and de-icing vehicle to the de-icing area.

Other symbolic examples are shown such as Stop signs and Exit signs which pop up onto the display for purposes of indicating to the flight crew that they must hold short of a runway or exit at a particular exit when landing.

The symbology shown is only representative of the concepts that are supported by such symbology. Any symbology supporting the airport surface concepts presented in this document may be used. It is recognized in the industry that for any particular symbology to be used it must by found to be acceptable to the flight crews and to the FAA Certification Office.

System Functional Features

Centralized management of clearances using accurate positioning sensors such as ASDE-X or ADS-B for optimal airport utilization.

Dynamic where events cause a need for a change in the clearance such as blocked taxiways, missed intended taxi exit, correction with a new clearance when needed with a new indication of the corrected taxi path Unambiguous display of the route to the terminal or runway, or an airplane to follow behind or both Automatic pop-up of a highlight for a reference airplane-to-follow as designated by a ground controller Management of time with speed, braking, acceleration, fuel, crossing management, to/from specific airline gate areas, wing span parallel taxiway spacing management for optimum arrival at the gate after landing or to the runway prior to takeoff Provides a traffic display to the ATC controller with flight crew acknowledgements of accepted ground clearances Location and management of all airport resources such as but not limited to anti-icing, baggage, and emergency vehicles in addition to ground taxiing airplanes Provides taxi destination such as gate, runway, or de-icing location Includes pilot routing request inputs to ATC by flight crews Airport information is displayed to the controllers and flight crew or vehicle operators such as taxiway or runway closures or construction, airport congestion such as blocked runways, taxiways or other surface areas, runway weight and wing span limits for pilot awareness Blunder or predicted blunder alerting with resultant re-routing and re-acknowledgement of new clearances Throttle cruise control (with auto braking if interface is provided) for more efficient taxiway usage with a windowed tolerance or text printout of required speed or time spacing Collision prevention system with modulated cruise control and/or braking system to slow or stop the airplane from running into another airplane, other vehicle, or obstacle Targeted runway exit/entrance or next exit/entrance if missed by the flight crew Hold short points calculated for flight crew awareness Display Description The following elements may be a part of an airplane display, vehicle display, or ground controller display for this invention:

- A flight director type of display of a speed target to maintain, such as a line or bar or a windowed box, that indicates the need for an adjustment of airplane speed.
- A highlighted reference airplane to follow.
- A numeric display of the speed target to attain.
- A highlighted, lined, outlined, described by text, indicated by symbology such as arrows pointing in the direction of the required route, or any other method of displaying the route to follow.
- Alert by voice or symbol or both for any adverse condition such as but not limited to blunders by other or own airplane or vehicles onto the wrong path or predictions of a blunder from acceleration or velocity calculations or other parameters that may be used to predict or detect a blunder, tolerance, missed turn, excessive speed, approaching airplane, blocked area or conflicted traffic for any reason.
- Hold short lines or areas where an airplane is expected to stop with caution areas highlighted, lined, outlined, described by text, indicated by symbology such as stop signs and/or colored surface areas or indicated by aural alerts.
- Time-left-to-hold numeric or graphical/symbolic indication.
- Time to engine start by numeric or graphical/symbolic indication.
- Time to engine stop by numeric or graphical/symbolic indication.
- Exit points highlighted, lined, outlined, described by text, indicated by symbology such as exit signs and/or colored surface areas and/or as indicated by aural alerts.
- Specific airplane configuration indications such as 777 or 320.
- Adjacent runway wing overlap based on specific airplane configurations indicated by highlighting airplanes by various means, or described by text or indicated by numeric or graphical/symbolic indications.

Other embodiments of the invention will be apparent to those skilled in the art from consideration of the specification and practice of the invention disclosed herein. It is intended that the specification and examples be considered as exemplary only, with a true scope and spirit of the invention being indicated by the following claim.

What is claimed is:

1. A system, comprising:

a display; and a receiver coupled to the display for receiving a signal representing verbal content spoken by a human for transmission as a VHF message and for presenting on the display data representing the verbal content spoken by the human; and wherein the display is configured to provide automatic pop-up of a highlight of a reference airplane-to-follow based on the data, and wherein the data comprises routing instructions comprising at least an identification of the reference airplane-to-follow, wherein the reference airplane-to-follow comprises an airplane to follow behind, wherein the system is configured to operate in an own ship.

2. The system of claim 1 wherein the human comprises an Air Traffic Controller.

3. The system of claim 1 wherein the human comprises an operator of an aircraft on an airport within proximity of the system.

4. The system of claim 2 wherein the content comprises instructions directing an aircraft hosting the system to a runway for take-off.

5. The system of claim 2 wherein the content comprises instructions directing an aircraft hosting the system to an arrival gate.

6. The system of claim 2 wherein the content comprises instructions directing an aircraft hosting the system to an area for de-icing operations for the aircraft.

7. The system of claim 3 wherein the content comprises communication intended to coordinate travel between an aircraft hosting the system and the aircraft carrying the operator.

8. The system of claim 1, further comprising:

a cruise control configured to monitor a spacing between the own ship and the reference airplane-to-follow.

9. The system of claim 8, wherein the cruise control is further configured to stop the own ship when the reference airplane-to-follow stops.

10. The system of claim 8, wherein the cruise control is further configured to provide a textual indication of at least one of required speed or time spacing.

11. The system of claim 1, wherein the automatic pop-up of the highlight comprises circling the airplane-to-follow.

* * * * *